United States Patent [19]

Cross, Jr.

[11] 3,790,863

[45] Feb. 5, 1974

[54] SCR CONTROL CIRCUIT

[75] Inventor: Laurence Allan Cross, Jr., Groveville, N.J.

[73] Assignee: Randomatic Data Systems, Inc., Trenton, N.J.

[22] Filed: Oct. 20, 1972

[21] Appl. No.: 299,315

[52] U.S. Cl. 317/148.5 B, 307/252 UA, 317/DIG. 8

[51] Int. Cl. ........................................ H01h 47/32

[58] Field of Search........ 317/148.5 B, 157, DIG. 8; 234/30, 48, 51; 318/132; 310/30; 307/252 N, 252 H, 252 UA, 252 W; 323/22 SC

[56] References Cited

UNITED STATES PATENTS

| | | | |
|---|---|---|---|
| 3,335,291 | 8/1967 | Gutzwiller | 307/252 UA |
| 3,345,546 | 10/1967 | Beltramo | 317/148.5 B |

*Primary Examiner*—J. D. Miller
*Assistant Examiner*—Harry E. Moose, Jr.
*Attorney, Agent, or Firm*—Sperry and Zoda

[57] ABSTRACT

Closure of a switch controlling flow from a source of alternating current effects a single triggering of a silicon controlled rectifier to produce a precisely timed pulse of a given, uniformly maintained magnitude, utilized to actuate a solenoid or other load. On closure of the switch, the circuit becomes operative only upon the initiation or the ascendancy of the next positive half of an AC sine wave, to energize a relay that operates to trigger one or more SCR's during the negative half of the same wave. A Class F commutation of the SCR occurs during the positive half of the next following sine wave. Means is included in the circuit to prevent re-triggering of the SCR if the switch is held closed, thus to produce one and only one load-actuating pulse of a duration precisely timed at less than a single cycle of alternating current.

9 Claims, 1 Drawing Figure

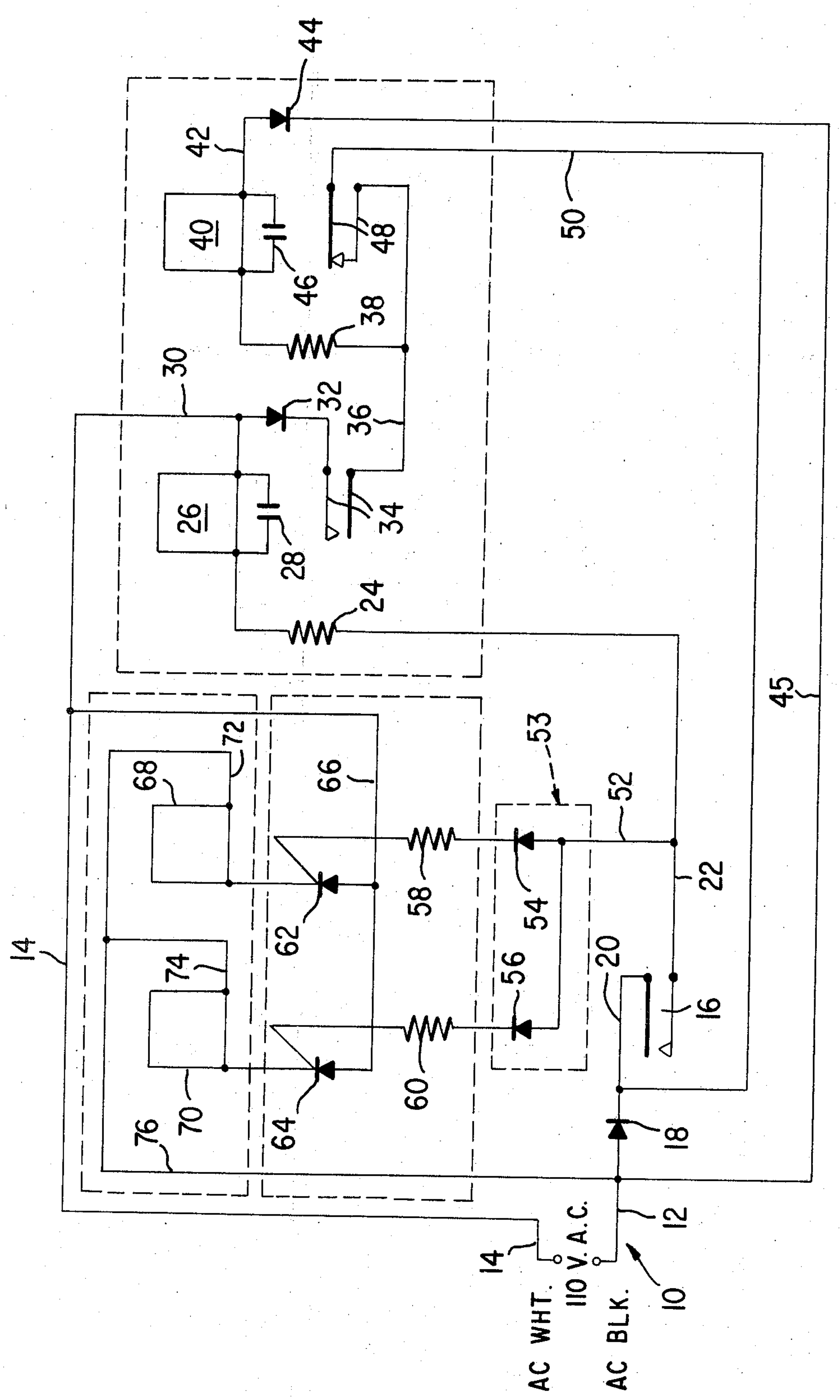
AC WHT.
110 V.A.C.
AC BLK.
10
12
14
16
18
20
22
24
26
28
30
32
34
36
38
40
42
44
45
46
48
50
52
53
54
56
58
60
62
64
66
68
70
72
74
76

SCR CONTROL CIRCUIT

BACKGROUND OF THE INVENTION

1. Field of the Invention

The invention pertains, in general, to the art of supplying a single pulse of electrical energy, responsive to closure of a switch for an imprecisely timed interval, in a manner to create an electrical pulse the interval and magnitude of which is precisely established notwithstanding the imprecision or non-uniformity of switch closures effected, in general manually, by a user.

More particularly, the invention pertains to the creation of a precisely timed pulse of a given, maximum intensity, for the purpose of actuating one or more solenoids or equivalent devices employed to convert electrical to mechanical energy.

2. Description of the Prior Art

Many situations arise in which the desirability of a uniformly maintained, precisely timed electrical pulse, for actuating a solenoid, manifests itself. For example, in the art of random access filling devices, such as shown in my U.S. Pat. No. 3,625,416 issued Dec. 7, 1971, and in the art of card punching devices, an example of which will be found in my U.S. Pat. No. 3,536,255 issued Oct. 27, 1970, the need arises for actuating one or more solenoids momentarily, responsive to depression of a key on a key board or console. In such instances, any arrangement in which the energy directed through the solenoid is affected even partially by the length of time that an operator holds the switch closed, requires large, heavy duty solenoids. This is by reason of the fact that in the prior art, it has been customary in some instances to use solenoids that remain energized as long as a user holds the switch in a closed condition, and in view of the tendency of the solenoids to heat up, large, heavy duty devices are needed.

In the prior art, it has been suggested that SCR's be employed to provide pulses for solenoids. However, circuits that have been heretofore devised to serve this purpose are either complex or load-sensitive. Accordingly, they are difficult to mass produce without the burden of stringent production and quality control procedures.

Still further, circuits heretofore devised have not been well adapted for operating a multiplicity of solenoids, in any desired number, again due to the complexity of the circuitry which has heretofore militated against the addition of solenoids without a consequent multiplying of the complexity already inherent in the circuit.

SUMMARY OF THE INVENTION

Summarized briefly, the present invention utilizes an AC current source, in which a switch, as for example a momentary switch adapted to be closed by an operator, is connected to the positive side of the circuit. The switch controls flow to a relay, selected so as to prevent flow of current to the relay sufficient to energize the same, except at the beginning or the ascendancy of the positive half of a single sine wave.

The relay operates to close a circuit, as the AC cycle goes into the negative half, to and including a second relay, having normally closed contacts which remain closed for a time period sufficient to produce a potential at one or more SCR's, sufficient to fire the same during the negative half of the wave. This actuates one or more solenoids associated with the SCR's, and the actuation occurs only while the SCR is firing. Firing of the SCR or SCR's is limited to a time duration substantially equal to that of a negative half wave of a single 110 volt AC current cycle, thus producing a precisely timed pulse of a given magnitude, for actuating the solenoid. Re-triggering of the SCR is prevented, even though the switch may be held down, through the provision of a second relay, adapted to open the normally closed relay contacts during the firing or a consequent Class F commutation of the SCR associated with each solenoid. Thus, a precisely timed pulse of a given, uniformly maintained, magnitude is produced responsive to depression or closure of a switch, and subsequent pulses do not occur in the circuit unless and until the switch is opened and remade.

The circuit is so arranged as to permit a multiplicity of SCR's, and their associated solenoids or equivalent loads, to be connected in parallel, in a simple arrangement whereby each solenoid and its associated SCR is, in effect, a separately insertable or removable unit, as regards other similar solenoid and SCR assemblies, capable of insertion in or removal from the circuit without complicating the circuit in any way.

The circuit design, further, by reason of the arrangement described, permits light solenoids to be utilized for tasks which have heretofore required heavy duty solenoids, considering that heavier, larger solenoids were required in light of their being energized according to the length of time that the operator would hold the switch closed. Further, the provision of lighter solenoids is possible due to the fact that the pulse is always of a full magnitude, permitting strong solenoid operation despite the relative lightness thereof. Heretofore, arrangements which permitted energizing of a solenoid at, for example, the termination or during the descendance of a positive half wave, resulted in an ineffective, weak signal for energizing the solenoid.

BRIEF DESCRIPTION OF THE DRAWING

The single FIGURE of the drawing illustrates, schematically the circuit comprising the present invention.

DESCRIPTION OF THE PREFERRED EMBODIMENT

Referring to the drawing in detail, designated generally at 10 is a pulsing circuit according to the present invention.

Extending from a source of 110 V. a.c. are the opposite sides 12, 14 of the circuit constituting the present invention. The description which follows assumes side 12 of the circuit to carry the a.c. sine wave, and for purposes of convenience, this side of the circuit will be hereafter termed AC Black, with the opposite side 14 being "0" or ground, and being hereinafter termed AC White.

Designated at 16 is a normally open, manually operable momentary switch. Switch 16, in a typical operating embodiment, might be a key board switch, closed by momentary depression of a selected key of a key board, such as shown, for example, in U.S. Pat. No. 3,625,416 issued to me on Dec. 7, 1971, covering an apparatus for selecting randomly filed code cards. In the patented apparatus, depression of a key bearing a numerical indicium is operable to energize, a pair of solenoids which are simultaneously, momentarily energized to translate electrical energy directed thereto into mechanical energy utilized to actuate selector slides which together represent the numerical indicium on the depressed key.

A diode 18 is connected in a lead 20 extending from AC Black to one terminal of the contacts of switch 16, and permits flow from AC Black to and through switch 16 when the switch is closed. Connected to the other terminal of switch 16 is a lead 22 extending from switch 16 to one terminal of a resistor 24, the other terminal of which is connected to one terminal of the winding of a first relay 26. A capacitor 28 is connected between the terminals of the relay winding.

Extending from the other terminal of the relay winding is a lead 30, connected to the opposite side 14, that is, AC White, of the circuit 10.

Also connected to said other terminal of relay 26 is the anode of a diode 32, the cathode of which is connected to one of a pair of normally open relay contacts 34 adapted to be closed by energizing of relay 26. To the other relay contact is connected a lead 36 whereby a resistor 38 is connected between the other relay contact 34 and one terminal of a second relay 40, the other terminal of which has a connection 42 to a diode 44 from the cathode of which extends a lead 45 to AC Black. A capacitor 46 is connected between the opposite terminals of the winding of relay 40.

Controlled by relay 40 is a set of normally closed relay contacts 48, one of which is connected to lead 36 between resistor 38 and the first relay contacts 34, and the other of which has a connection 50 in the form of a lead terminating in a connection to lead 20 between switch 16 and diode 18.

A lead 52 provides a connection that extends from lead 22 between switch 16 and resistor 24, to a diode matrix 53 including, in the illustrated example, a pair of diodes 54, 56 separately connected to the lead 52, and permitting current flow from 52 to resistors 58, 60 connected to the cathodes of the respective diodes 54, 56.

The resistors 58, 60 are respectively in series connection between the cathodes of the diodes 54, 56 and the gates of a pair of silicon controlled rectifiers 62, 64 the anodes of which have a common connection 66 to AC White between the current source and relay 26.

A pair of solenoids 68, 70, comprising the loads energized to translate the electrical to mechanical energy, respectively have one terminal connected to the cathodes of the respective SCR's 62, 64 associated with and controlling the energizing of the solenoids. The other terminals of the solenoids 68, 70 have leads 72, 74 connecting the same to a lead 76 connected to the AC Black between the source of power and the anode of diode 18.

OPERATION

Due to the presence of diode 18 between switch 16 and the current source, in the AC Black side of the circuit designated by the reference numeral 12, circuit 10 does not become operable should switch 16 be closed by a user during the existence of a negative half wave in the circuit. For, if switch 16 were to be closed at this point in time, the diode 18 would block passage of negative current flowing from AC White to AC Black. Accordingly, no circuit action takes place unless and until a positive portion of the sine wave appears at AC Black.

Further, should it happen that the user closes switch 16 at a point in time at which there is a positive half wave at AC Black, but said half wave has passed its high point and is diminishing or terminating, in this situation also there would be no circuit action. This is so because closure of switch 16 at this point in time would result in a positive potential insufficient to energize relay 26. Relay 26 must be energized to cause the circuit to operate for its designed purposes. Relay 26 will not operate, however, if switch 16 is closed during the termination of a positive half wave, because it is selected to operate within the time space of one complete positive half wave.

Accordingly, no matter what may be the point in time at which the user happens to close switch 16, no circuit action will take place until the next complete positive half wave appears at AC Black.

Accordingly, upon closure of switch 16, current will flow, concurrently with the beginning of a complete positive half wave, from AC Black through diode 18, lead 20, closed switch 16, lead 22, resistor 24, the winding of relay 26, capacitor 28, lead 30, and back to the current source through the AC White side 14 of the circuit.

This may be considered as stage one of the circuit, said stage occurring during the existence of the first complete positive half wave appearing in circuit 10 at AC Black while switch 16 is in a closed condition.

Stage two occurs during the negative half wave immediately following the above mentioned first complete positive half wave. Stage two results from the fact that capacitor 28 will have been charged during stage one. Capacitor 28 is selected to sustain energization of relay 26 during the negative portion of the sine wave occurring during stage two.

Keeping in mind that relay 26 was energized on the first complete positive half wave and is sustained by capacitor 28 in an energized condition through the following negative half wave, it will be seen that the normally open contacts 34 of said relay will be in a closed condition during said succeeding negative half wave.

In these circumstances, during stage two, which spans the second, negative half of a single complete current cycle, current flows from AC White through lead 30, diode 32, closed relay contacts 34, lead 36, resistor 38, the winding of relay 40, capacitor 46, lead 42, diode 44, and lead 45 to the AC Black side 12 of the circuit.

Simultaneously with completion of the circuit from AC White to AC Black occurring during stage two, that is, the negative half wave immediately following the first complete positive half wave, current will flow through normally closed relay contacts 48, from lead 36, and will pass through lead 50, the closed switch 15, lead 52, diodes 54, 56 of diode matrix 53, resistors 58, 60 to the gates of the SCR's 62, 64 respectively.

Current will also be present, flowing from AC White through the side 14 of the circuit and through lead 66, at the anodes of the SCR's 62, 64. Since the cathodes of the SCR's are connected by leads 72, 74 to a lead 76 extending to AC Black, it will be obvious that during stage two, the gates and the anodes of the SCR's are both at a higher potential than the cathodes thereof. As a result, the SCR's will both fire simultaneously and will conduct simultaneously to the loads comprising the solenoids 68, 70 respectively.

At this point, it may be observed that the normally closed relay contacts 48 will be closed to produce the gate current for the SCR's as described above, due to the fact that even though relay 40 is at this point being energized, the reactance of the relay 40 and capacitor 46 circuit results in opening of the relay contacts 48 considerably later than the required length of time necessary to trigger the SCR's.

The circuitry described and operating as set forth above is effective to cause the solenoids 68, 70 to be energized by an impulse of maximum strength, that is completely uniform and is of full strength each and every time the circuit comprising the present invention goes into operation responsive to the manual closing of switch 16. Further, the solenoids are energized only for an exact, pre-determined length of time represented by the time during which a single negative half wave is in existence in the circuit.

Even though the switch 16 should be held closed, the circuit described is such that the SCR's will not retrigger on any succeeding portions of the AC sine wave. This is due to the fact that the circuit utilizes the basic phase shift characteristics of an AC sine wave to achieve the end results, and for this reason the SCR action can be and is terminated by what is known in the art as Class F commutation, an inherent characteristic of an SCR occurring during the next following positive half wave causing it to cease functioning once the AC sine wave goes into the negative portion of said next following cycle.

As previously noted, capacitor 28 holds relay 26 energized sufficiently to maintain closure of relay contacts 34 during the negative portion of the single cycle in which the circuit is in operation, and will do so even should switch 16 be opened at this point in time.

It may also be observed, with respect to that characteristic of the circuit, that since the anodes of the SCR's go to AC White, the cathodes to the loads 68, 70, and the loads go to AC Black, through lead 76, the SCR's 62, 64 can be triggered only by a gate current that is positive in respect to the cathodes of the SCR's. Initially, when switch 16 was closed and current was flowing therethrough from AC Black during the positive portion of the cycle, it was true that positive current appeared in lead 52, and hence at the gates of the SCR's. However, there could at that time be no firing of the SCR's because there was no difference in potential between the gates thereof and the cathodes, for the reason that there was also positive current of the same potential in the cathodes of the SCR's, the leads 72, 74, and lead 76 connected to AC Black.

Recalling now that firing of the SCR's resulted while contacts 48 were still closed, said contacts 48 open as the negative half wave of stage two remains in existence. With the aid of capacitor 46, relay 40 will be held energized to hold contacts 48 open for as long as switch 16 is held closed. It can therefore be concluded that together with the aid of the Class F commutation of the SCR's previously described herein which would normally occur on the next following positive half wave, no further signal will be available to re-trigger the SCR's since the contacts 48 must be in a closed condition to permit this to happen. At such time as the contacts 48 revert to their normally closed condition after complete dissipation of the energy stored by capacitor 46, the Class F commutation of the SCR's will have been completed, so that re-triggering is not possible in any event for the reasons set forth above. Thus, switch 16 must be opened, before a triggering circuit to the SCR's can be re-established. This is possible only by re-closing of the switch.

It can be seen that such a circuit is of obvious advantage where only a single, timed, uniform pulse of full strength is wanted to a load such as a solenoid used for performing a mechanical function once and only once per each closure of a switch.

In the illustrated example, the circuit has been illustrated as it would appear when a single switch is used to control simultaneous operation of the two solenoids. In the patented apparatus referred to above, for example, each number key of the key board illustrated and described therein is depressed to energize a pair of solenoids simultaneously.

However, it is by no means critical to the invention that the switch 16 control energization of two solenoids. The illustrated example is provided merely to show the particular adaptability of the invention for actuating a multiplicity of loads simultaneously, in any number. The circuits could be employed as well for actuating a single solenoid. Thus, it is sufficiently obvious as not to require separate illustration that the load 70, together with its associated lead 74, SCR 64, resistor 60, and diode 56, could be removed in which event the circuit would operate to actuate a single solenoid 68. Or, it is also believed obvious that additional solenoids, with their associated SCR's and resistors, could be connected in parallel with the solenoids 68, 70.

I claim:

1. An electrical system of the type in which a load, such as a solenoid, is actuated by firing of an SCR comprising:

a. switch means arranged to permit current to flow from a source of alternating current when the switch means is operated;
b. at least one SCR connected to said load in a circuit configuration effective to actuate the load by firing of the SCR; and
c. means responding to the presence of half of a single AC sine wave in said system to fire said SCR during the other half of the same wave, said firing means operating in two stages occurring during the respective halves of said wave, said firing means including a first relay energized in the first stage to close, during said second half of the wave, a circuit to a second relay the contacts of which are normally closed and are in circuit with the current source and the gate of the SCR during the second half of the wave, said contacts of the second relay opening upon energization of the second relay but after the firing of the SCR, to permit firing of the SCR only once during each operation of the switch means.

2. An electrical system of the type in which a load, such as a solenoid, is actuated by firing of an SCR comprising:

a. switch means arranged to permit current to flow from a source of alternating current when the switch means is operated;
b. at least one SCR connected to said load in a circuit configuration effective to actuate the load by firing of the SCR; and
c. means responding to the presence of half of a single AC sine wave in said system to fire said SCR during the other half of the same wave, including successively energized relays both of which are energized during said single sine wave, one to close and the other to open a firing circuit to the SCR.

3. An electrical system of the type in which a load, such as a solenoid, is actuated by firing of an SCR comprising:

a. switch means arranged to permit current to flow from a source of alternating current when the switch means is operated;
b. at least one SCR connected to said load in a circuit configuration effective to actuate the load by firing of the SCR; and
c. means responding to the presence of half of a single AC sine wave in said system to fire said SCR during the other half of the same wave, including first and second relays having normally open and normally closed contacts respectively, said first relay being energized by said first half of the sine wave upon operation of the switch, the contacts thereof being in circuit with the second relay and with the AC source to energize the second relay, said contacts of the second relay also being in circuit with the AC source and the SCR, to fire the SCR during the second half of the sine wave before opening of the second relay contacts in response to energizing of the second relay.

4. An electrical system of the type in which a load, such as a solenoid, is actuated by firing of an SCR comprising:

a. switch means arranged to permit current to flow from a source of alternating current when the switch means is operated;
b. at least one SCR connected to said load in a circuit configuration effective to actuate the load by firing of the SCR; and
c. means responding to the presence of half of a single AC sine wave in said system to fire said SCR during the other half of the same wave, including first and second relays, the first relay being energized by the first half wave of current originating in one side of the AC source upon operation of the switch means to close a circuit originating in the other side of said source and that includes the SCR whereby the SCR will be fired during the other half wave of the same AC current cycle, the second relay being connected to said other side of the AC source by energization of the first relay and in a circuit configuration effective to open the circuit to the SCR after a single firing of the same.

5. An electrical system connectable to the positive and negative sides of an AC source, said system being of the type in which a load such as a solenoid is actuated by firing of an SCR and comprising:

a. a switch connectable to one of said sides;
b. an SCR arranged to actuate the load;
c. first control means adapted to be operated by one half wave of current flowing from said side of the AC source in response to closure of the switch to close a firing circuit to the SCR from the other side of the source, whereby the SCR will fire in the presence of the other half wave of the same AC cycle; and
d. second control means also connected to said other side of the AC source to be actuated by the other half wave and thereafter remain actuated in a circuit configuration arranged to open and hold open the firing circuit after a time delay sufficient for a single firing of the SCR.

6. An electrical system as in claim 5 wherein the SCR is arranged for a Class F commutation thereof during the half wave of AC current occurring after a single firing thereof, whereby to be precluded from firing more than once per each closure of the switch, by reason of said commutation and the opening of the firing circuit by the second control means.

7. An electrical system as in claim 5 in which the first control means is a relay including a winding connected by the switch to said one side of the AC source, and a set of normally open contacts closed by energization of said winding and arranged, when closed, to connect the second control means to said other side of the AC course.

8. An electrical system for connection to the positive and negative sides of a course of alternating current, said system being of the type in which a load such as a solenoid is actuated by firing of the SCR comprising:

a. a normally open switch connected to one side of the AC source for flow of current past the switch when the switch is closed;
b. a first relay including a winding and a set of normally open contacts, the contacts being in series with the other side of said source, said winding being connected between the switch and the opposite side of the AC source so as to be energized and close its contacts during the first half wave of current flowing from said one to the other side of the current source;
c. an SCR having an anode connected to said other side of the AC source, a cathode connected to said one side of the source in series with a load, and a gate;
d. a second relay including a winding and a set of normally closed contacts, the second relay winding being connected between the first relay contacts and said one side of the AC source so as to be energized by the second half wave of the same AC cycle, the contacts of the second relay being connected between the first set of contacts and the gate so as to trigger and fire the SCR during the second half wave of said AC cycle, said second relay being adapted, after a time delay sufficient for a single firing and commutation of the sCR, to open the second set of contacts and hence the circuit from said other side of the AC source to the gate.

9. An electrical system of the type in which a load, such as a solenoid, is actuated by firing of an SCR, comprising:

a. a switch operative to permit current to flow from a source of alternating current;
b. at least one SCR connected to said load in a circuit configuration effective to actuate the load by firing of the SCR; and
c. an SCR control means operative in two stages occurring during the respective halves of a single AC sine wave in said system to fire the SCR for a time period substantially equal in duration to half said wave and thereby produce a single, precisely timed load-actuating pulse, including
   1. an SCR triggering means that responds to random operation of said switch to become activated at the beginning of one half of said wave and is operative to fire the SCR at the beginning of the other half of the same wave, and 2. means activated within the time span of the second half of said wave in response to activation of the SCR triggering means to limit the SCR to a single firing, the duration of which substantially equals said time span.

* * * * *